United States Patent
Nagargadde et al.

(10) Patent No.: US 10,621,389 B1
(45) Date of Patent: *Apr. 14, 2020

(54) SELECTING PLATFORM-SUPPORTED SERVICES

(71) Applicant: Amazon Technologies, Inc., Seattle, WA (US)

(72) Inventors: Aparna Nagargadde, Herndon, VA (US); Scott King Walker, Purcellville, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/804,610

(22) Filed: Nov. 6, 2017

Related U.S. Application Data

(63) Continuation of application No. 13/215,993, filed on Aug. 23, 2011, now Pat. No. 9,817,807.

(51) Int. Cl.

| | | |
|---|---|---|
| *G06F 40/186* | (2020.01) | |
| *H04L 29/08* | (2006.01) | |
| *G06F 7/544* | (2006.01) | |
| *G06F 9/4401* | (2018.01) | |

(52) U.S. Cl.
CPC ........... *G06F 40/186* (2020.01); *H04L 67/22* (2013.01); *H04L 67/34* (2013.01); *G06F 7/5443* (2013.01); *G06F 9/4401* (2013.01)

(58) Field of Classification Search
CPC .... G06F 2221/2115; G06F 8/36; H04L 63/20; H04L 2463/102; H04L 2463/101; H04L 2463/103; H04L 2209/60; H04L 2209/56; H04L 9/3247; H04L 63/0428; H04L 63/08; H04L 63/083; H04L 9/3218; H04L 9/3263

See application file for complete search history.

(56) References Cited

U.S. PATENT DOCUMENTS

| 6,473,794 B1 * | 10/2002 | Guheen | H04L 41/22 709/223 |
| 7,047,177 B1 * | 5/2006 | Lee | H04L 41/0823 703/22 |
| 8,145,798 B1 * | 3/2012 | Buck | G06F 8/61 709/203 |
| 2004/0103407 A1 * | 5/2004 | Blaukopf | G06F 8/00 717/140 |

(Continued)

OTHER PUBLICATIONS

Office action for U.S. Appl. No. 13/215,993, dated Jan. 28, 2013, Nagargadde et al., "Selecting Platform-Supported Services", 15 pages.

(Continued)

*Primary Examiner* — Aftab N. Khan
(74) *Attorney, Agent, or Firm* — Lee & Hayes, P.C.

(57) ABSTRACT

A network-based services platform receives a template that at least partially indicates an application to be performed, a service type, and at least one service parameter associated with the service type. The platform identifies one or more available network-accessible services corresponding to the service type, and assigns the identified network-accessible service to be used by the application. Each identified network-accessible service includes at least one service parameter.

19 Claims, 7 Drawing Sheets

(56) References Cited

U.S. PATENT DOCUMENTS

| | | | | |
|---|---|---|---|---|
| 2005/0220278 | A1* | 10/2005 | Zirngibl | G06Q 10/025 379/67.1 |
| 2006/0140385 | A1* | 6/2006 | Haase | H04L 29/06 379/221.09 |
| 2007/0093916 | A1* | 4/2007 | Sanghvi | G06F 11/30 700/17 |
| 2007/0251998 | A1 | 11/2007 | Belenki | |
| 2007/0294668 | A1* | 12/2007 | Mohindra | G06F 8/36 717/120 |
| 2009/0077371 | A1* | 3/2009 | Powell | H04L 9/083 713/152 |
| 2009/0125631 | A1 | 5/2009 | Blom et al. | |
| 2010/0110933 | A1* | 5/2010 | Wilcock | G06Q 10/10 370/255 |
| 2010/0114618 | A1* | 5/2010 | Wilcock | G06Q 10/06 705/7.37 |
| 2010/0115490 | A1* | 5/2010 | Wilcock | G06F 8/10 717/104 |
| 2010/0218104 | A1* | 8/2010 | Lewis | G06Q 10/04 715/736 |
| 2010/0262559 | A1* | 10/2010 | Wilcock | G06Q 10/00 705/348 |
| 2010/0322069 | A1 | 12/2010 | Song et al. | |
| 2011/0060627 | A1* | 3/2011 | Piersol | G06Q 10/06395 705/7.31 |
| 2011/0126207 | A1* | 5/2011 | Wipfel | H04L 9/3213 718/104 |
| 2011/0196940 | A1* | 8/2011 | Martinez | H04L 29/06 709/217 |
| 2013/0132854 | A1 | 5/2013 | Raleigh et al. | |

OTHER PUBLICATIONS

Office Action for U.S. Appl. No. 13/215,993, dated Nov. 26, 2014, Apama Nagargadde, "Selecting Platform-Supported Services", 17 pages.

Office action for U.S. Appl. No. 13/215,993, dated Apr. 20, 2017, Nagargadde et al., "Selecting Platform-Supported Services", 20 pages.

Office action for U.S. Appl. No. 13/215,993, dated Jun. 19, 2013, Nagargadde et al., "Selecting Platform-Supported Services", 19 pages.

Office action for U.S. Appl. No. 13/215,993, dated Jul. 29, 2016, Nagargadde et al., "Selecting Platform-Supported Services", 19 pages.

Office action for U.S. Appl. No. 13/215,993 dated Aug. 18, 2015, Nagargadde et al., "Selecting Platform-Supported Services", 19 pages.

\* cited by examiner

SELECTING PLATFORM-SUPPORTED SERVICES

PRIORITY CLAIM

This application is a continuation of U.S. patent application Ser. No. 13/215,993 filed Aug. 23, 2011, titled "Selecting Platform-Supported Services," now U.S. Pat. No. 9,817,807, which issued on Nov. 14, 2017, the entire disclosure and contents of which are hereby incorporated herein by reference.

BACKGROUND

Large-scale, network-based computing represents a paradigm shift from traditional client-server computing relationships. With large-scale, network-based service platforms (e.g., data centers), customers are able to leverage shared resources on demand by renting resources that are owned by third parties and that reside "in the cloud." With these resources, customers of the platform are able to launch and maintain large applications without actually owning or servicing the underlying infrastructure necessary for these applications. As a result, network-based service platforms have expanded the class of individuals and companies able to effectively compete in the realm of computing applications.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 4B is a continuation of FIG. 4A, as indicated by the off-page reference connectors labeled "CONT".

DETAILED DESCRIPTION

This disclosure describes systems, devices, and techniques for building applications and services in conjunction with network-accessible services such as offered by a network-based services platform. Network-based services platforms offer a variety of scalable resources, including computational capacity, memory, and functionality. When designing an application that is to be implemented by network-accessible services, a developer may specify an application template. Such an application template may define the application by characterizing one or more desired network-accessible services that are to form part of the application or that are to support the application. Rather than specifying or identifying specific services, the template may specify desired characteristics and/or parameters of the services.

The application template may be submitted to a network-based services provider, which may respond by identifying one or more networked or network-accessible services having the characteristics specified by the application template. The network-based services provider may report the availability of the identified network-accessible services, and the developer may then select from among the available network-accessible services. After receiving the developer's selections, the network-based services provider may then provision or instantiate the services in conjunction with the developer's application.

In certain embodiments, the network-based services provider, rather than reporting the availability of multiple services, may automatically select from the available services based on criteria specified by the application template. For example, the template may instruct the network-based services provider to select based on cost, service levels, geographic location, and so forth. In these embodiments, the network-based services provider may automatically provision or instantiate the selected services, without further input from the developer.

Figure 1:
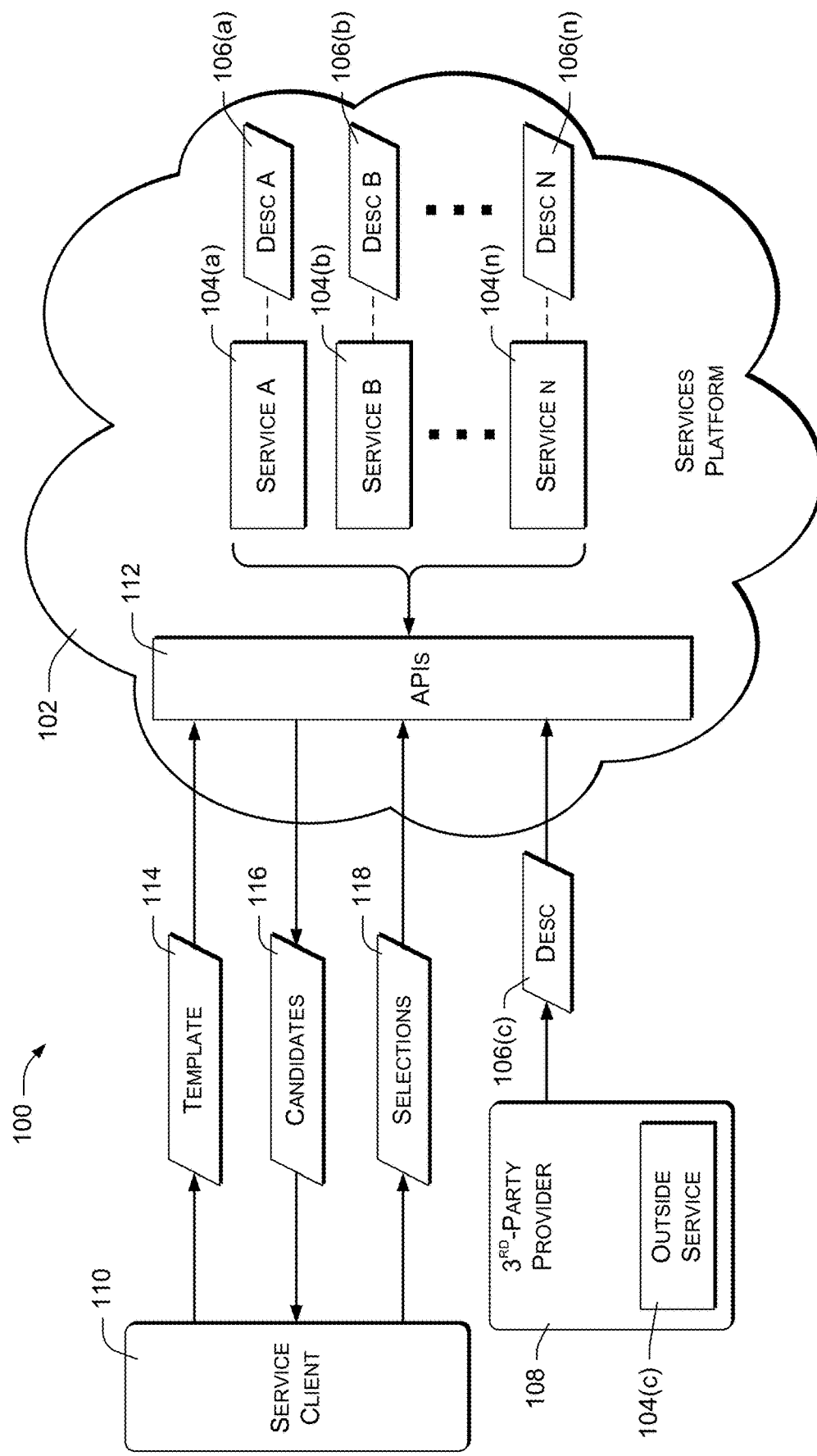
FIG. 1 is a block diagram illustrating an example environment within which network-based applications may be specified in accordance with techniques described herein.

FIG. 1 illustrates an environment 100 for designing and building a network-supported application in accordance with these techniques. The environment of FIG. 1 includes a network-based platform or services provider 102 that provides network-accessible services 104, which may include both resources and functionality. The network-based platform 102 and its network-accessible services 104 may be referred to as Infrastructure as a Service (IaaS) and/or Platform as a Service (PaaS). The network-based services platform 102 may implement services with dedicated servers, shared servers, virtual servers, server slices, processors, processor cycles, and so forth. The network-accessible services 104 may also include storage and memory. Generally, the network-accessible services 104 are available in scalable increments or amounts, which can be dynamically increased or decreased in response to usage and/or demand. Service fees may be tied to the amount of the resources that are actually used.

The network-accessible services 104 available from the network-based services platform 102 may also include functional elements or services. Functional elements or services may comprise applications or sub-applications that are used as building blocks for customer or developer applications. For example, the network-based services platform 102 may provide predefined database functionality in the form of a discrete service that can be instantiated on behalf of the developer. Functional components may relate to network communications and other services or activities. Network-related services may, for example, include firewalls, load balancers, filters, routers, and so forth. Additional functional components may be available for such things as graphics processing, language translation, searching, etc. Furthermore, functional components and/or services may be provided either by the network-based services platform 102 itself, or by $3^{rd}$-party developers or providers in conjunction with the network-based services platform 102. Note that the functional services may themselves comprise applications that utilize the services and resources of the network-based services platform 102.

The network-based services platform 102 may include service or resource descriptions 106, which may correspond respectively to individual services 104. That is, each available service 104 may have a corresponding service description 106, and each service description 106 may characterize a corresponding service 104. For example, the service 104(*a*) may have a corresponding description 106(*a*), the service 104(*b*) may have a corresponding description 106(*b*), and so forth.

The services 104 may be characterized by service types or categories, such as by the types or categories of services they provide. Different types or categories of services may include database services, web servers, firewalls, file replicators, storage services, encryption services, authentication services, and so forth. In some embodiments, services may be categorized at a relatively high level. For example, a "database services" category may include various different implementations of database services. In other embodiments, services may be categorized more specifically or narrowly, such as by type or family of database services. In embodiments such as this, for example, there may be different categories for relational databases services and non-relational database services, and for SQL and other implementations of databases services.

The service description 106 for a particular service 104 may also indicate parameters of the service. Service parameters may correspond to options, configuration details, speeds, capacities, variations, quality-of-service (QoS) assurances/guaranties, and so forth. In the example of a database service, the service parameters may indicate the type of database (relational vs. non-relational, SQL vs. Oracle, etc.), its capacity, its version number, its cost or cost metrics, its network communication parameters, and so forth. For example, service parameters may indicate communication modes, such as data rates, protocols, and so forth. Cost parameters may indicate fees for using the service, including usage-based feeds and fixed fees.

Certain of the services 104 may be provided or implemented by 3$^{rd}$-party developers or providers 108. Such 3$^{rd}$-party services may be hosted by and implemented upon the network-based services platform 102, or may alternatively be hosted apart from the network-based services platform 102. As an example, FIG. 1 shows a service 104(*c*) that is implemented outside of the network-based services platform 102 by the 3$^{rd}$-party provider 108. The 3$^{rd}$-party provider 108 may provide a service description 106(*c*) to the network-based services platform for inclusion in the service descriptions 106.

Developers, who may include platform users and/or customers, may communicate with the network-based services platform 102 from a service client 110, such as a computer or other equipment. The service client 110, as well as 3$^{rd}$-party providers 108, may communicate with the network-based services platform 102 through one or more application programming interfaces (APIs) 112 of the network-based services platform 102. The APIs 112 may be designed to support various client functions and communications, and may be accessible through local-area or wide-area networks, including the Internet. Note that the services client 110, the 3$^{rd}$-party providers 108, and the network-based services platform 102 may reside on different networks or sub-networks.

In order to create an application, the developer may create an application template 114 and submit it to the network-based services platform 102 through the APIs 112. The application template 114 may specify different types of services that are needed or desired by the application, as well as parameters that further define or characterize such services. For example, the template 114 may specify that the developer application will use a relational database service, and may additionally specify parameters for the service such as the minimum number of tables and/or rows that should be supported by the service, the QoS that the service should support, the maximum cost of the service, and so forth. Generally, the categorizations and parameters specified by the application template 114 will correspond in nature to the categorizations and parameters used in the service descriptions 106.

The application template 114 may be formatted in accordance with various standard representation or compositional languages such as eXtensible Markup Language (XML) or JavaScript Object Notation (JSON) formats. In addition to specifying service characterizations as described above, the application template 114 may specify how services are to be interconnected, as well as other details that may be useful in instantiating the developer application.

In response to receiving the application template 114, the network-based services platform searches or analyzes its service descriptions 106 to find services among its available services 104 that match those specified by the application template 114. Thus, if the application template 114 specifies a service of a particular type or category, the network-based services platform 102 locates services within that type or category. If the application template 114 additionally specifies parameters of a desired service, the network-based services platform 102 limits the results of its search to those services 104 having parameters that satisfy or are compatible with those specified by the application template.

After searching its service descriptions 106 for compatible or qualified services, the network-based services platform 102 returns a listing of service candidates 116. The candidates 116 may include all available services having classifications and service parameters compatible with those specified by the application template 114.

Upon receiving the candidates 116, the client or developer may select which of the indicated candidate services should be used in the application. The client 110 may then return a set of selections 118 to the network-based services platform 102 through the APIs 112, and the network-based services platform 102 may respond by provisioning the selected services 118 and by performing any other actions that may be needed to instantiate the application specified by the application template 114.

Figure 2:
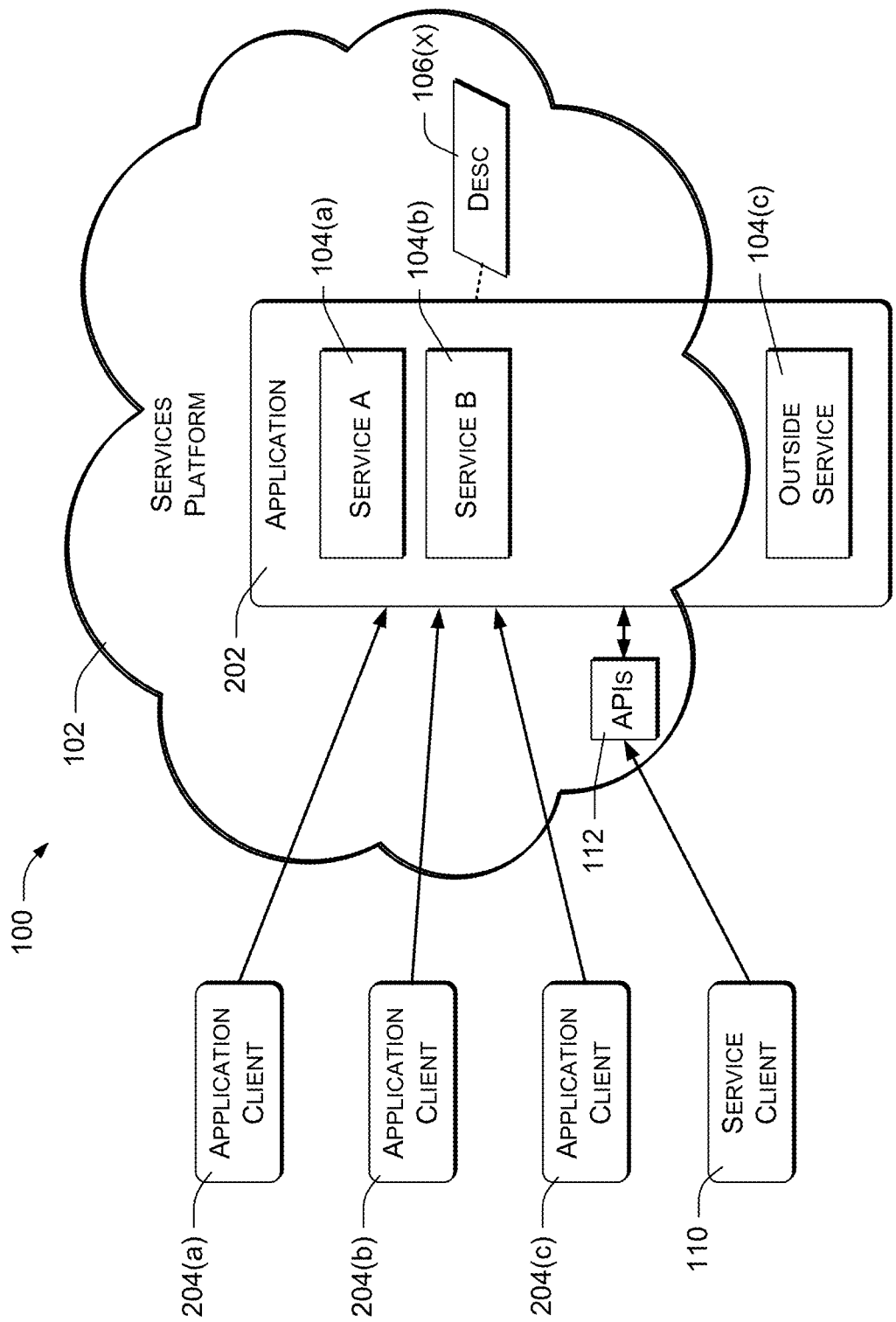
FIG. 2 is a block diagram illustrating further aspects of the example environment shown in FIG. 1, including a network-based application.

FIG. 2 illustrates further aspects of the environment 100, showing the results of creating a network-based application 202 in accordance with the techniques described above. The network-based application 202 in this example has been created and/or provisioned based upon the platform-provided services 104(*a*) and 104(*b*), and the outside service 104(*c*). The application 202 communicates with and provides services and functionality to a plurality of application clients or consumers 204. The service client 110 may be used by the application developer to communicate through the APIs 112 with the network-based services platform 102 and the application 202, to control and supervise the application 202.

Note that the application 202 may itself be considered one of the available services 104 of the services network-based services platform 102, and may have its own service description 106(*x*) that is part of the service descriptions 106 maintained by the network-based services platform 102.

Figure 3:
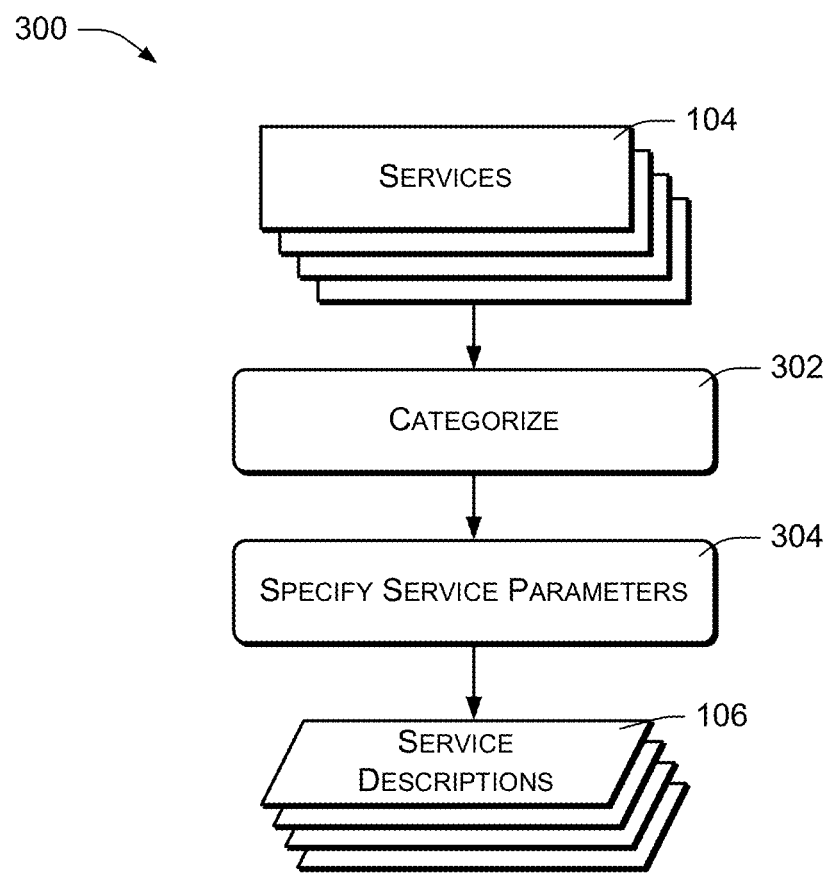
FIG. 3 is a flow diagram illustrating the creation of service descriptions corresponding to services and/or resources available from a network-accessible services provider.

FIG. 3 illustrates an example of a method 300 performed by or in conjunction with the network-based services platform 102 to create the service descriptions 106. An action 302 comprises categorizing or characterizing the available network-accessible services 104 in accordance with their service types or categories. As described above, different categories may correspond to different types of services, such as database services, storage services, different types of network services, and so forth. Furthermore, the categorized services may include services offered or provided by $3^{rd}$ parties, as well as services and applications hosted apart from the network-based services platform 102.

An action 304 comprises specifying service parameters for each of the network-accessible services 104. Service parameters may relate to various specific aspects of the functionality provided by individual services, including capacity, security, capabilities, speed, cost, geographic location of the services, communication protocols and parameters, QoS assurances or guaranties, and functional characteristics.

Actions 302 and 304 may be performed by developers, providers, and/or analysts. For example, the developers or providers of respective network-accessible services 104, including $3^{rd}$-party developers and providers, may provide categorizations and service parameters for the services they have developed or provided. Alternatively, human analysts may examine existing network-accessible services 104 and provide the categorizations and parameters.

The categorizations of action 302 and the service parameters specified by action 304 are combined to form individual service descriptions 106 for respective services 104. Service descriptions 106 may be expressed in various different formats, including as key-value pairs and/or in markup formats such as XML and JSON.

Figure 4A:
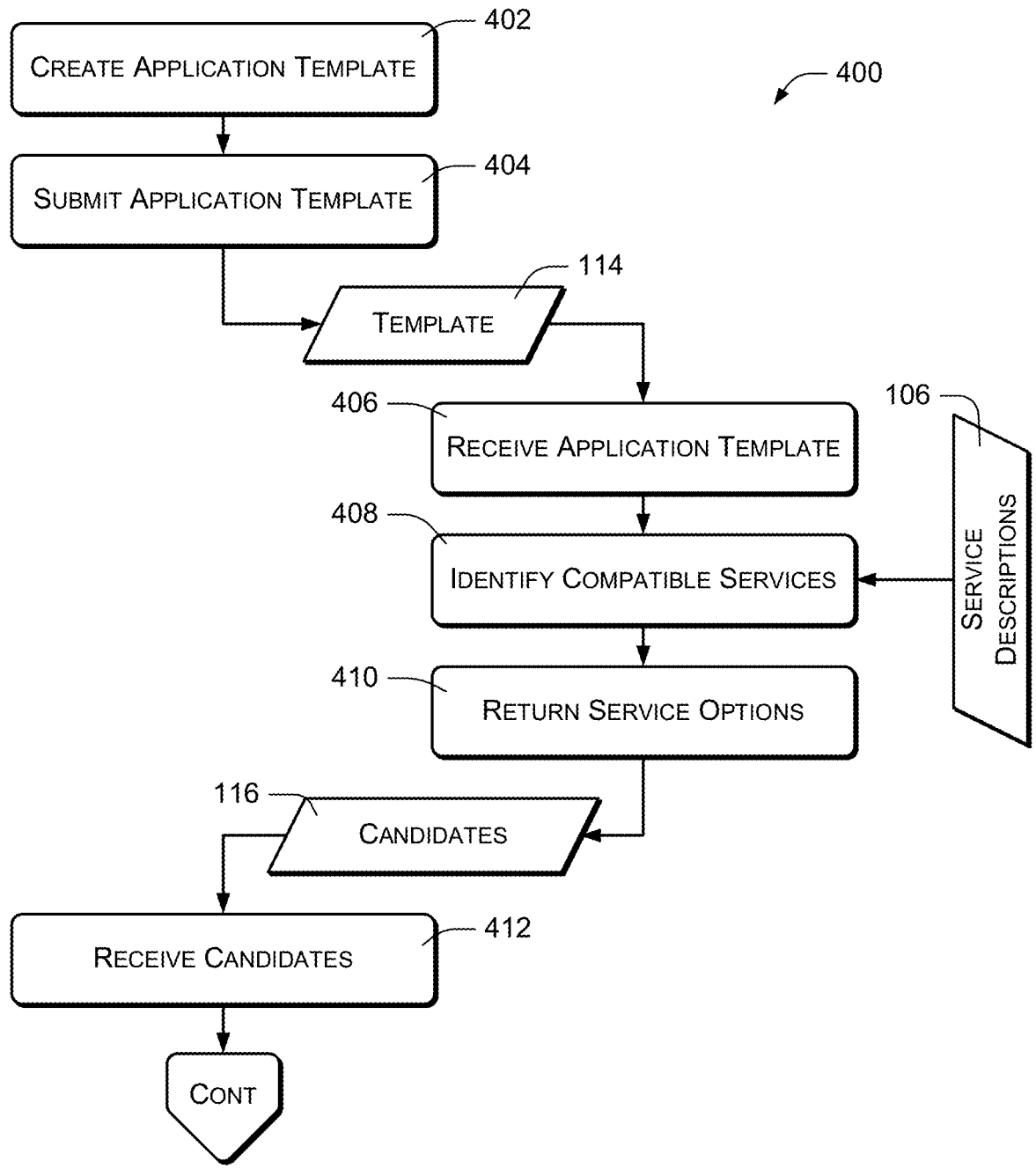
FIGS. 4A and 4B are sections of a flow diagram illustrating actions performed in building and provisioning a network-based application using services available from a network-accessible services provider.
Figure 4B:
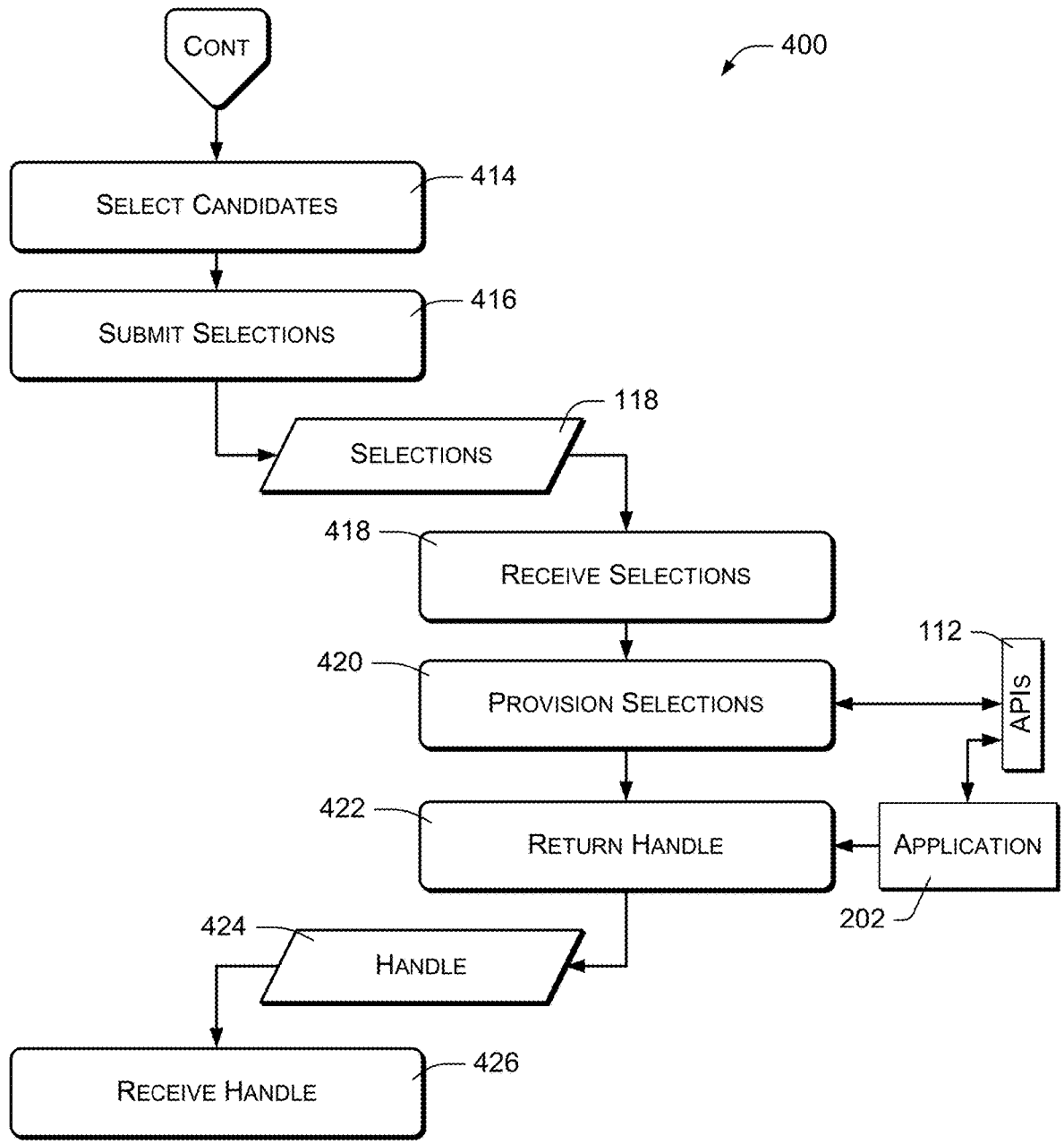

FIGS. 4A and 4B show an example of a method 400 that may be performed by the user, developer, or service client 110 and the network-based services platform 102 when implementing the techniques described above. Actions performed by the service client 110 are shown on the left. Actions performed by the network-based services platform 102 are shown on the right. Exchanges and communications between the service client 110 and the network-based services platform 102 may take place through the APIs 112 of the network-based services platform 102.

An action 402, performed by the service client 110, comprises creating an application template 114. The application template 114 may define the network-based application 202 at least partially in terms of one or more network-accessible services or resources, and the desired characteristics of such services or resources. For example, the template 114 may specify a desired service as a relational database that supports SQL, or a load balancer that supports at least a specified number of simultaneous connections. As discussed above, the desired characteristics of the services or resources may be specified at least partially in terms of service types and service parameters, wherein service types correspond to relatively broad categorizations of services and service parameters correspond to more specific characteristics or functions of the services. The application template 114 may be expressed in various different formats, including as key-value pairs and/or in markup formats such as XML and JSON.

An action 404 comprises submitting the application template 114 to the network-based services platform 102. An action 406 comprises receiving the template 114 by the network-based services platform 102. As already described, the application template 114 may specify desired network-accessible computing services in terms of service types and service parameters.

In response to receiving the application template 114, the network-based services platform 102 may perform an action 408 of identifying qualified or compatible network-accessible services from a plurality of services 104 that are available from the network-based services platform 102. Qualified network-accessible services are any services having service types and service parameters that are compatible with the service types and service parameters specified by the received application template 114. Thus, the action 408 may include searching available network-accessible computing services to identify compatible services, based on the characteristics of the services and the service characteristics specified by the application template 114. The searching may include services implemented by or within the network-based services platform 102, as well as services implemented outside the network-based services platform 102.

An action 410, performed by the network-based services platform 102, comprises returning a listing or indication of candidate services 116, consisting of those services identified in the action 408. An action 412, performed by the service client 110, comprises receiving the candidate services 116, which identifies qualified network-accessible resources having characteristics that are compatible with the desired characteristics as specified by the submitted application template 114.

An action 414, performed by the service client 110, comprises selecting individual services or resources from the candidates 116. This action may be performed programmatically, or by interacting with a human analyst, programmer, or developer. For example, qualifying services, along with their service types and parameters, may be presented to the developer, who may then make a selections from multiple alternatives based on their service parameters.

An action 416, performed by the service client 110, may comprise submitting the selections 118 resulting from the action 414 to the network-based services platform 102. An action 418, performed by the network-based services platform 102, comprises receiving the selections 118. In response to receiving the selections 118, the network-based services platform 102 may also perform an action 420 of provisioning the selected services indicated by the selections 118, and by performing any other steps that might be needed to instantiate the network-based application 202 defined by the template 114 and by the selections 118. This may include initializing, allocating, configuring, instantiating, initiating, and so forth. The provisioning 420 may be performed in conjunction with the APIs 112.

Note that in some embodiments, the actions 410, 412, 414, 416, and 418 may be omitted, and the network-based services platform may be configured at action 408 to select from compatible services without further instructions from the service client 110. When multiple compatible services exist, the network-based services platform 102 may select from among those services based on criteria or priorities specified in the template 114. For example, the template may specify that cost is to be a determining factor, and that the network-based services platform 102 should select those services having the lowest cost. Service levels and geographic location of the services are other factors that may be specified by the template 114.

An action 422, performed by the network-based services platform 102, may comprise obtaining a handle or other reference 424 to the instantiated application 202, and returning the handle 424 to the service client 110, which receives the handle 424 in an action 426. The handle 424 may comprise information regarding the application 202 and how to access the application 202, such as descriptions, addresses, security parameters, and so forth.

Note that although the various functions described above have been attributed either to the service client 110 or the network-based services platform 102, the described functionality may be allocated in different ways. Thus, in some embodiments the service client 110 may perform functions that are described above as being implemented by the network-based services platform 102. Similarly, the network-based services platform 102 may perform functions that are described above as being implemented by the service client 110. Furthermore, certain implementations may include additional elements or actors that perform some of the described actions.

Figure 5:
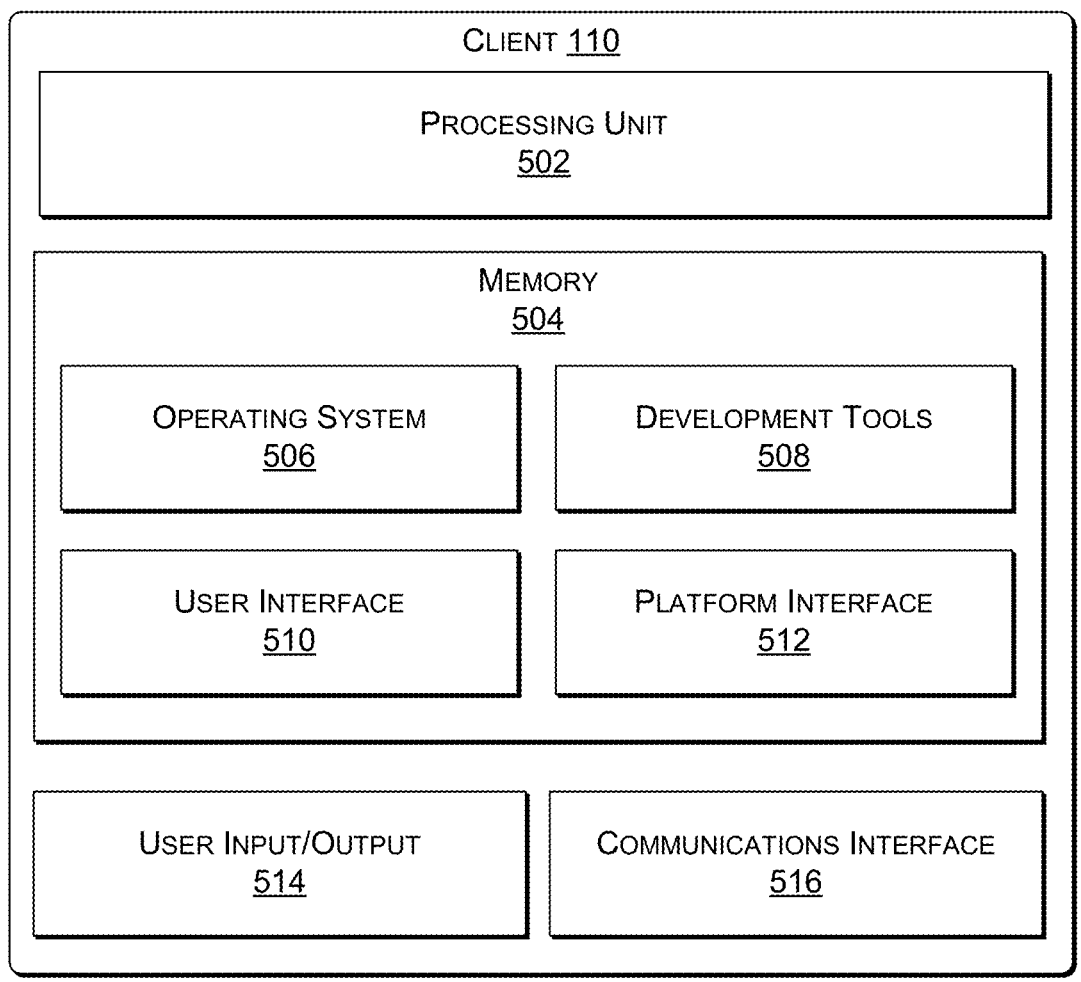
FIG. 5 is a block diagram showing high-level components of a client that may be used in conjunction with the techniques described with reference to FIGS. 1-4.

FIG. 5 shows relevant components of an example service client 110. In this example, the service client 110 may be implemented by a computer having one or more processing units 502 and memory 504. The memory 504 may comprise computer storage media and may include volatile and nonvolatile memory. Thus, the memory 504 may include, but is not limited to, RAM, ROM, EEPROM, flash memory, or other memory technology, or any other medium which can be used to store applications and data. The memory 504 may be used to store any number of functional components, such as programs and program modules, that are executable on the processing unit 502. Thus, the memory 504 may store an operating system 506 and development tools 508. The development tools may operate in conjunction with a user interface 510 to allow a human developer or programmer to create an application template, to submit the application template, and to select from qualifying platform services as described above. The memory 504 may also contain a platform interface 512 for communicating through the APIs 112 with the network-based services platform 102.

The service client 110 may also have user input/output components 514, such as a display, keyboard, mouse, etc. The service client 110 may also comprise a communications interface 516 such as a network interface, for communicating with the network-based services platform 102.

Figure 6:
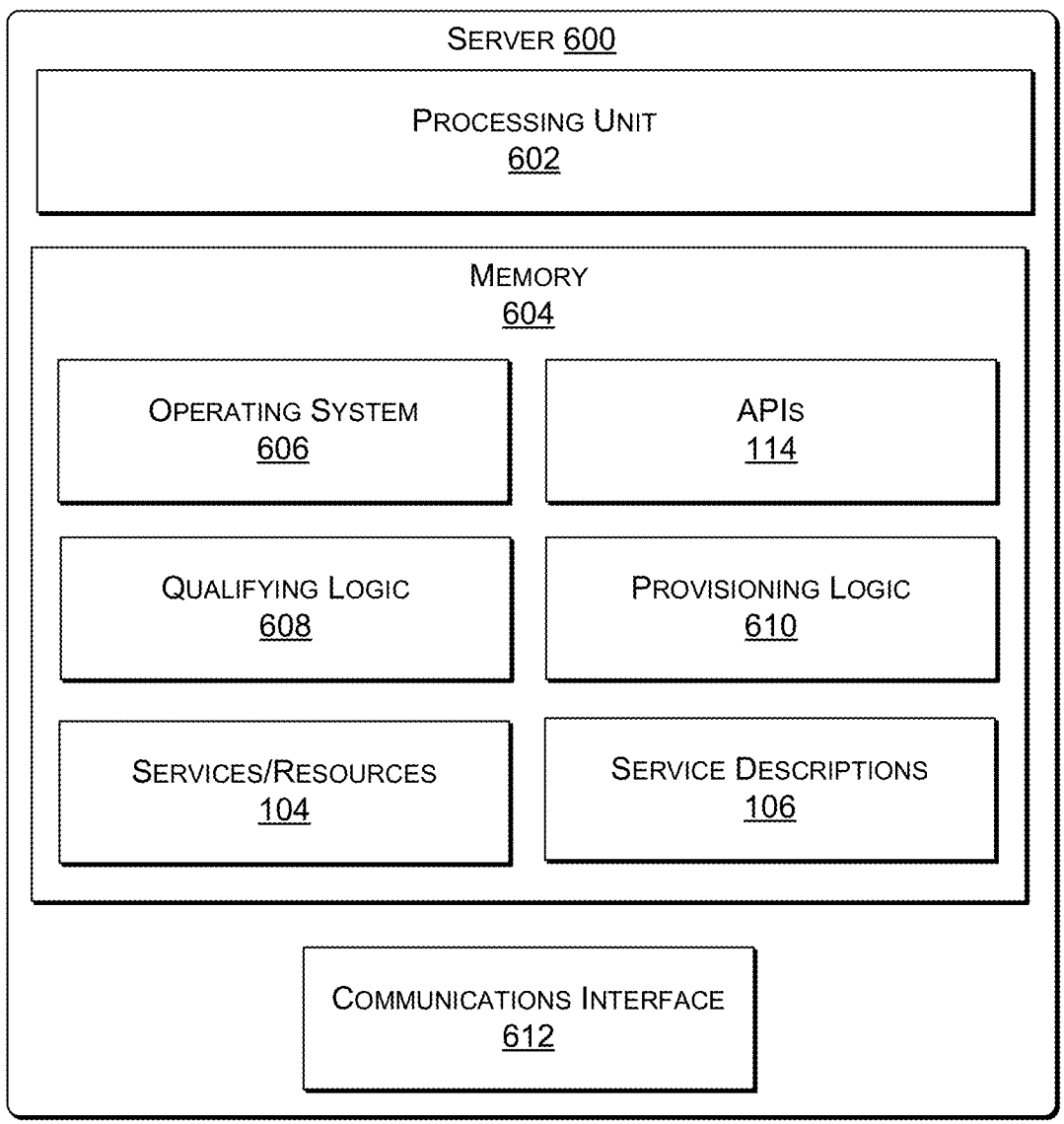
FIG. 6 is a block diagram showing high-level components of a server that may be used to implement the network-based services platform shown in FIGS. 1 and 2.

FIG. 6 illustrates relevant components of a server 600 that may be used to implement the functionality of the network-based services platform 102. Generally, this functionality may be implemented by one or more servers or similar devices, with the various actions described above distributed in various ways across the different servers. Servers may be located together or separately, and organized as virtual servers, server banks, and/or server farms. The described functionality may be provided by the servers of a single entity or enterprise, or may utilize the servers and/or services of multiple entities or enterprises.

In a very basic configuration, an example server 600 might comprise a processing unit 602 composed one of one or more processors, and memory 604. The memory 604 may comprise computer storage media and may include volatile and nonvolatile memory. Thus, the memory 604 may include, but is not limited to, RAM, ROM, EEPROM, flash memory, or other memory technology, or any other medium which can be used to store media items or applications and data which can be accessed by the server 600.

The memory 604 may be used to store functional components, such as programs and program modules, that are executable on the processing unit 602. Thus, the memory 604 may store an operating system 606 as well components, modules, and/or logic for performing the actions attributed above to the network-based services platform 102. For example, the memory 604 may contain the APIs 112 through which external clients may interact with the network-based services platform 102. The memory 604 may also contain qualifying logic 608 for receiving application templates and selecting qualifying services. The memory 604 may further contain provisioning logic 610 for receiving client selections and for provisioning selected services. The memory may also contain instances of the services or resources 104 and the service descriptions 106.

The server 600 may also have a communications interface 612, such as a wired or wireless network interface, for communicating with various clients and other network entities, including the service client 110 and the application clients 204.

The server 600 may of course include many other logical, programmatic, and physical components, of which those shown in FIG. 6 are merely examples that are related to the discussion herein. Thus, the server 600 may include communications interfaces, storage devices, input/output components, and so forth.

The various techniques described above are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:

one or more processors;

at least one non-transitory computer-readable storage media storing computer-executable instructions that, when executed by the one or more processors, cause the one or more processors to:

receive a template associated with an application, the template specifying a service type which at least one of forms part of the application or supports the application, the template also specifying a feature of the service type, the feature being a characteristic comprising at least one of: a relational database; a relational database which supports SQL; a load balancer; a load balancer supporting at least a specified number of simultaneous connections; a markup format; an XML markup format; or a JSON markup format;

identify, based on a plurality of service descriptions for a plurality of services, one or more services of the plurality of services which are of the service type, have the feature, and are accessible via the system, a service description of the plurality of service descriptions indicating a service type and one or more features of a service of the plurality of services;

provide a listing of the one or more services which were identified and receive a selection of at least one service from the listing, or select, based upon selection criteria specified in the template, at least one service from the one or more services which were identified; and assign the at least one service which was selected to the application.

2. The system of claim 1 wherein the computer-executable instructions on the non-transitory computer-readable storage media further cause the one or more processors to:

receive third-party service descriptions corresponding to network-accessible services that are implemented on the system by third-party users of a network-based platform, the third-party service descriptions indicating characteristics of the network-accessible services implemented on the system by the third-party users; and wherein to identify one or more services includes searching to identify the network-accessible services implemented on the system by the third-party users, the searching based at least in part on the third-party service descriptions.

3. The system of claim 1 wherein the computer-executable instructions on the non-transitory computer-readable storage media further cause the one or more processors to:

receive third-party service descriptions corresponding to network-accessible services that are implemented outside the system, the third-party service descriptions indicating characteristics of the network-accessible services implemented outside the system; and wherein to identify one or more services includes searching to identify the network-accessible services implemented outside the system, the searching based at least in part on the third-party service descriptions.

4. The system of claim 1, wherein the services comprise load balancers.

5. The system of claim 1, wherein the services comprise firewalls.

6. At least one non-transitory computer-readable storage media storing computer-executable instructions that, when executed by one or more processors, cause the one or more processors to:

receive a template created by a user, the template being associated with an application and specifying:

a service type which at least one of forms a part of the application or supports the application, and relates to one or more of a processing speed of the application, a geographic location of a server device hosting the application, or a communication protocol used by the application; and a feature of the service type, the feature being a characteristic of the service type comprising at least one of: a relational database; a relational database which supports SQL; a load balancer; a load balancer supporting at least a specified number of simultaneous connections; a markup format; an XML markup format; or a JSON markup format;

identify, based on a plurality of service descriptions for a plurality of network-accessible services, one or more services of the plurality of network-accessible services which are of the service type, are available, and have the feature, a service description of the plurality of service descriptions indicating a service type and one or more features of a service of the plurality of network-accessible services; and assign, based upon selection criteria specified in the template, at least one service from the one or more services which were identified to the application.

7. The at least one non-transitory computer-readable storage media of claim 6, wherein the service type further relates to one or more of: capacity; features; or capabilities.

8. The at least one non-transitory computer-readable storage media of claim 6, wherein the plurality of services comprise one or more of: computational capacity; storage capacity; or one or more relational databases.

9. A computer-implemented method, comprising:

receiving a template associated with an application, the template specifying a service type which at least one of forms part of the application or supports the application, the template also specifying a feature of the service type, the feature being a characteristic of the service type comprising at least one of: a relational database; a relational database which supports SQL; a load balancer; a load balancer supporting at least a specified number of simultaneous connections; a markup format; an XML markup format; or a JSON markup format;

identifying, based on a plurality of service descriptions for a plurality of network-accessible services, one or more services of the plurality of network-accessible services which are of the service type, are available, and have the feature, a service description of the plurality of service descriptions indicating a service type and one or more features of a service of the plurality of network-accessible services;

generating, based upon selection criteria specified in the template, at least one instantiation of a service from the one or more network-accessible services which were; and sending, to a device associated with receiving the template, a reference handle of the instantiation that provides access to the at least one instantiation.

10. The computer-implemented method of claim 9, wherein identifying one or more services of the plurality of network-accessible services comprises identifying available network-accessible services on a network-based platform.

11. The computer-implemented method of claim 9, and further comprising categorizing each service which is available by at least one service type.

12. The computer-implemented method of claim 9, and further comprising categorizing each service which is available by at least one service parameter.

13. The computer-implemented method of claim 9, wherein the template indicates that the application is implemented on a network-based platform.

14. The method of claim 9, wherein at least one service of the network-accessible services comprises a filter.

15. The method of claim 9, wherein at least one service of the network-accessible services comprises graphics processing.

16. The method of claim 9, wherein at least one service of the network-accessible services comprises language translation.

17. The method of claim 9, wherein at least one service of the network-accessible services comprises at least one of web servers or file replicators.

18. The method of claim 9, wherein at least one service of the network-accessible services comprises encryption services.

19. The method of claim 9, wherein the reference handle comprises a security parameter associated with the instantiation.

* * * * *